United States Patent [19]

Rowe

[11] Patent Number: 4,840,643

[45] Date of Patent: Jun. 20, 1989

[54] TRICHROMATIC COMBINATION OF DYES FOR NYLON

[75] Inventor: Jay E. Rowe, Douglasville, Pa.

[73] Assignee: Crompton & Knowles Corporation, Stamford, Conn.

[21] Appl. No.: 168,657

[22] Filed: Mar. 16, 1988

[51] Int. Cl.[4] .................. C09B 1/00; C09B 29/00; C09B 45/00

[52] U.S. Cl. .................. 8/641; 8/638; 8/643; 8/676; 8/679; 8/680; 8/684; 8/687; 8/917; 8/924; 8/929

[58] Field of Search .................. 8/641, 676, 643

[56] References Cited

U.S. PATENT DOCUMENTS

| | | | |
|---|---|---|---|
| 4,402,704 | 9/1983 | Raisin et al. | 8/641 |
| 4,445,905 | 5/1984 | Schaetzer et al. | 8/641 |
| 4,579,561 | 4/1986 | Rowe et al. | 8/641 |
| 4,749,784 | 6/1988 | Feeman et al. | 8/641 |
| 4,773,914 | 9/1988 | Harms et al. | 8/641 |

FOREIGN PATENT DOCUMENTS 1586411  3/1981  United Kingdom .

Primary Examiner—A. Lionel Clingman
Attorney, Agent, or Firm—Bernard Francis Crowe

[57] ABSTRACT

A trichromatic dye combination especially suited for the continuous dyeing of synthetic polyamide materials; the system including an acid red dye component, an acid blue dye component and an acid yellow dye component, each of said dye components being selected on the basis of minimum and compatible cold strike and compatible on tone strike rates.

The trichromatic combination according to the invention dyes synthetic polyamide fibers from aqueous liquors, producing level dyeings having excellent fastness properties including good lightfastness and good ozone fastness.

23 Claims, No Drawings

TRICHROMATIC COMBINATION OF DYES FOR NYLON

The object of the present invention is to provide a new trichromatic combination dye system, especially suited for, but not limited to, the continuous dyeing of synthetic polyamide carpeting. The trichromatic system is an additive dye mixture of selected yellow-, red- and blue- dyeing dyes, which by choice of quantitative combination can impart any desired shade of the visible color spectrum to a synthetic polyamide substrate, according to the techniques of the dyeing and printing arts.

For a trichromatic dye combination to function satisfactorily in a continuous dyeing process, in addition to the usual desirable fastness properties—wet fastness, crock fastness, light fastness, and stability to deleterious atmospheric gases—it is essential that the individual dye components of the system be compatible from a performance standpoint. Specifically, the color components must possess substantially the same aqueous solution stability, substantially the same cold strike, substantially the same dyeing rate, and substantially the same migration character. Only when the individual components are thus similar will the trichromatic combination exhibit uniform strike, exhaustion and build-up under the particular time and temperature conditions encountered in the dyeing operation and therefore provide uniform, on tone, build of the desired hue. Such uniformity is particularly essential in the continuous trichromatic dyeing of polyamide carpet in order to minimize or eliminate the occurrence of front to back or side-center-side shade differences or streaks on the carpet.

As used in this application, and unless a contra intent is clearly evident from the context, the term "dyeing" is used in its broadest sense to cover the coloring of the fiber by the application of a color component from an aqueous solution and includes coloration by printing with aqueous print pastes as well as by conventional dyeing techniques. In addition, the terms "yellow dye" or "yellow color component" are also used to include compounds that are commercially designated as yellow dyes and as orange dyes.

Although thousands of acids dyes capable of dyeing synthetic polyamide fibers are known, the selection of a compatible combination of red, yellow and blue components to construct an effective trichromatic system is not easily accomplished and is especially aggravated due to ever changing technologies of dyeing. Thus the trichromatic combination of C. I. Acid Blue 324, C. I. Acid Orange 156, (Structure III) and C. I. Acid Red 266 has been a "work horse" system in the synthetic polyamide carpet industry and in fact is still in use at certain mills; however, it is known to those skilled in the art that this combination is characterized by a relatively broad range, in comparison to recently documented systems (U.S. Pat. No. 4,402,704 and U.S. Pat. No. 4,579,561), of strike and migration properties and therefore its use under certain conditions may lead to the occurance of front to back and side-center-side shade differences in the continuous dyeing of solid shade contract carpet. The finding and selecting of compatible red, yellow and blue dyes is particularly difficult because, under the present state of the art, persons skilled in the art cannot with certainty predict the degree to which structural alterations of a dye can influence a dye's performance, nor can they predict with certainty how an incompatible dye should be structurally modified to render it compatible with the other color component or components of the system.

The primary object of this present invention is to provide a new trichromatic dye combination that includes an acid red dye component, an acid blue dye component and an acid yellow dye component that is particularly suited for use in continuous dyeing applications where on-tone strike is desired, such as in continuous printing, foam dyeing and spray dyeing of carpets, and especially in dyeing units where high speed, computer controlled equipment is employed.

A second object of this invention is to provide a trichromatic combination of dyes that can be employed in exhaust dyeing processes such as the Beck dyeing of polyamide carpet.

Still another object of this invention is to provide a trichromatic combination that utilizes a dye mixture that has not heretofore been used. These and other objects of the invention are accomplished by a process for dyeing synthetic polyamide textile fibers by contacting said fibers with an aqueous solution containing a plurality of dyes, and in which one of the dyes in said solution is a red acid dye having the structure (I):

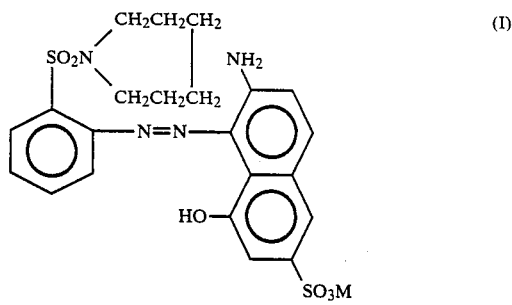

wherein M is —Na, —K, —Li or —N(R$_1$)$_4$, R$_1$ is —H or

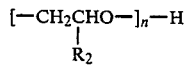

R$_2$ is —H, —CH$_3$ or —CH$_2$CH$_3$ and n is 1,2,3 or 4; said solution also contains at least one dye selected from a compatible acid blue dye, a compatible yellow dye, or a mixture of said blue and yellow dyes; said blue dye having the structure (II)

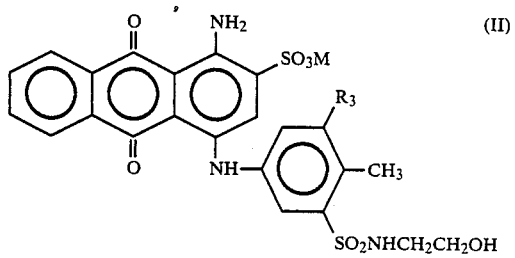

wherein R$_3$ is —H or —CH$_3$ and M has the same meaning as in Structure I above; and said yellow dye being at least one of the acid yellow dyes having the following structures (III) to (VII):

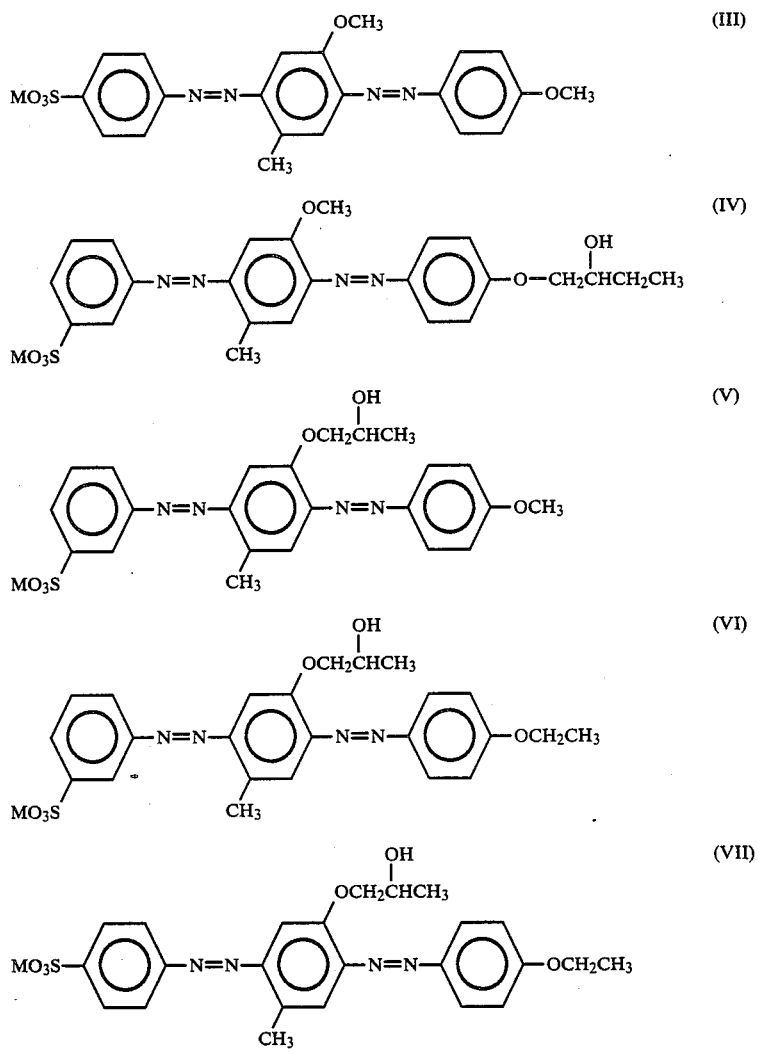

wherein M in each of said yellow dye structures has the same meaning as above in Structure I.

The above specified red dye of Structure I belongs to a family of red dyes that was known since at least 1935 (See British Pat. No. 465,955) and it has been known to be a red dye for natural and synthetic polyamide fibers; (German Pat. OLS No. 27 24 079); however, its compatibility with the above specified Structure II blue and Structure III–VII yellow dyes has not heretofore been recognized or demonstrated. The Structure I red dye exhibits superior light-fast dyeings on nylon, minimal sensitivity to hard water and is more highly compatible with the above-specified blue and yellow dye components of Structures II and III–VII than it is with other blue and yellow acid dyes commonly used in the dyeing of nylon carpet.

The blue dye, II ($R_3$=H) has been known (JSDC., 77,304,1961) and is cited as one possible blue component in another trichromatic system (USP 4,402,704); however, the breadth of dye structures covered in that system allows for trichromy combinations which would not exhibit the uniformity of strike and migration characteristic of the highly specific combinations described herein. The blue dye, II ($R_3$=—$CH_3$) is also listed in U.S. Pat. No. 4,402,704. Due to the close similarity in structure, the dyes, II, performs similarly in terms of strike and migration. The combination of the blue dyes, II, with Structure I red and Structures III–VII orange components has heretofore not been described. The orange dyes III–VII have been specifically selected because in addition to possessing the required fastness properties, economy and availability, they exhibit strike and migration rates which are very close to those of Structure I red dye and Structure II blue dye. The process of selection is described in Example I. Because of this careful selection process, all the possible trichromatic combinations described herein presents a system which will perform well in the continuous dyeing process.

The sodium sulfonates of dyes of Structures 1 to VII are preferred; however, where modified solubility characteristics are desired, the dyes can also be used as the potassium or lithium salts or as salts having the structure —$N(R_1)_4$, wherein $R_1$ is —H or

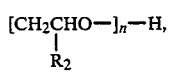

$R_2$ is —$CH_3$ or —$CH_2CH_3$, and n is 1,2,3 or 4. Examples are ammonium, alkanolammonium and polyalkanolammonium salts. Suitable alkanolammonium salts include the monoethanolammonium, diethanolammonium and triethanolammonium salts. Ethoxylated, propoxylated and butoxylated derivatives thereof, as well as mixtures of these derivatives, examplify the polyoxyalkanolammonium salts. Amines from which such salts are derived may be readily prepared by reacting ammonia, mono-, di- or trialkanolamines with ethylene oxide, propylene oxide, butylene oxide or mixtures thereof.

The concentrations of the color components can be varied in a conventional manner in order to develop the desired hue in the dyeing.

The following examples will serve to illustrate the compatibility of the color components used in the trichromatic dye system of this invention and will also illustrate the use of said system in the dyeing of polyamide carpet fibers. In the examples, parts and percentages are by weight and temperatures are in degrees Fahrenheit, unless otherwise stated.

EXAMPLE 1

On Tone Build Evaluation

Six identical dye baths (identified as A, B, C, D, E and F) were prepared according to the following formulation:

| | |
|---|---|
| Structure I red dye (M = Na) | .0077 parts |
| Structure II blue dye ($R_3$ = H, M = Na) | .0161 parts |
| Structure IV yellow dye (M = Li) | .0140 parts |

The dye solutions were diluted to 400 mls. with water and placed in the dye tubes of a tall form Ahiba dyeing machine. The pH of each bath was adjusted to 4.0±0.1 with acetic acid. The baths were all at room temperature.

Six 5 gram skeins (identified as skeins A', B', C', D', E', and F') of polyamide carpet fiber duPont 846 BCF T66 nylon were wet out in soft water. The six skeins were simultaneously placed in the dyeing tubes A through F, and the dyeing machine bath was adjusted to bring the bath temperature to 195° F. at a rate of 2° to 3° per minute.

Skein A' was removed when the bath temperature reached 150° F.

Skein B' was removed when the bath temperature reached 160° F.

Skein C' was removed when the bath temperature reached 170° F.

Skein D' was removed when the bath temperature reached 180° F.

Skein E' was removed when the bath temperature reached 195° C.

Skein F' was removed after continued dyeing at 195° C. for 25 minutes.

Upon removal all skeins were rinsed in cold water and dried. The color reflectance curves of each of the skeins were measured on an ACS 500 color control system. Each was compared to the F' skein on the Da* and Db* scale in CIE L*A*b* units. The actual hue difference between skeins A', E', and F' were then quantified by calculating $\sqrt{(Da^*)^2+(Db^*)^2}$ for skeins A' and E'. Given that Da* is a measure of color difference on the red-green axis and Db* on the yellow-blue axis, the value of $\sqrt{(Da^*)^2+(Db^*)^2}$ represents the total hue difference of the dyeings. The values were then graphed versus the final dye bath temperature and the absolute value of the slope of the lines determined. The smaller the value of the slope the greater is the consistency of hue of the dyeing as the temperature of the bath increases.

slope=0.02

For comparison to Example 1, the identical procedure was followed using dye baths prepared to the following formulation:

| | |
|---|---|
| Acid Red dye (Structure I, U.S. Pat. No. 4,579,561; n-dibutyl; M = Na) | .0198 parts |
| Structure II blue dye ($R_3$ = H, M = Na) | .0161 parts |
| Structure IV yellow dye (M = Li) | .0140 parts |

Analysis of the dyeing as described in Example 1 gave

|slope| =0.11

This value represents a significant difference in the slope as calculated and indicates an inconsistency in hue of the dyeing as the temperature of the bath increases.

EXAMPLES 3-7

The following dye mixtures were tested as described in Example 1 giving the listed results.

| Example 3: | Structure I red dye (M = Na) | .0077 parts |
|---|---|---|
| | Structure II blue dye ($R_3$ = $CH_3$, M = Na) | .0160 parts |
| | Structure III yellow dye (M = Na) | .0170 parts |
| | |slope| = 0.03 | |
| Example 4: | Structure I red dye (M = Na) | .0077 parts |
| | Structure II blue dye ($R_3$ = H, M = Na) | .0161 parts |
| | Structure III yellow dye (M = Na) | .0170 parts |
| | |slope| = 0.06 | |
| Example 5: | Structure I red dye (M = Na) | .0077 parts |
| | Structure II blue dye ($R_3$ = H, M = Na) | .0161 parts |
| | Structure V yellow dye (M = Na) | .0195 parts |
| | |slope| = 0.03 | |
| Example 6: | Structure I red dye (M = Na) | .0077 parts |
| | Structure II blue dye ($R_3$ = H, M = Na) | .0161 parts |
| | Structure VII yellow dye (M = Na) | .0185 parts |
| | |slope| = 0.04 | |
| Example 7: | Acid Red dye (Structure 15, U.S. Pat. No. 4,402,704) | .0042 parts |
| | Structure II blue dye ($R_3$ = $CH_3$, M = Na) | .0160 parts |
| | Structure III yellow dye (M = Na) | .0170 parts |
| | |slope| = 0.15 | |

In general terms those trichromies which give a slope value less than 0.10 yield dyeings which are most consistent in hue at varying dye bath temperatures. The smaller the value the more similar is the hue of individual dyeings made at different temperatures as described in Example 1.

EXAMPLE 8

Cold Strike Dip Test

A dyebath of total volume equal to 200 mls. was prepared according to the following formulation:

| | |
|---|---|
| Structure I red dye (M-Na) | .0039 parts |
| Structure II blue dye ($R_3$ = H, M = Na) | .0082 parts |

| -continued | |
|---|---|
| Structure III yellow dye (M = Na) | .0085 parts |

The pH of the bath was adjusted to 5.0±0.1 using monosodium phosphate and acetic acid prior to final dilution to 200 mls. Five 5 gram skeins of duPont 846 BCF T66 nylon were identified as A, B, C, D and E. Each skein was wet out in soft water.

The dyebath was placed in a renegal dyeing machine and the bath temperature adjusted to 140° F. and held at that value throughout the course of the dyeing.

Skein A was immersed in the dye bath for 2 minutes, then removed. Dye liquor absorbed in the skein was squeezed back into the dyebath.

Skein B was immediately immersed in the dyebath for 2 minutes, then removed. Dye liquor absorbed in the skein was squeezed back into the dyebath.

Skein C was next immersed in the dye bath for 2 minutes, then removed. Dye liquor absorbed in the skein was squeezed back into the dyebath.

Skein D was next immersed in the dyebath for 5 minutes then removed. Dye liquor absorbed in the skein was squeezed back into the dyebath.

Finally 2 mls. of 10% acetic acid was added to the dyebath and Skein E was immersed for 10 minutes, removed and squeezed free of bath liquor.

After dyeing, all together, the skeins A, B, C, D and E were rinsed in warm water, extracted and dried.

Upon visual comparison of the skeins A, B, C and D only minimal coloration of the skeins is noted and the coloration observed is on tone.

In order to quantify the cold strike assessment a new dyebath equal in quantity to the first, but of lesser concentration was prepared. The concentration was selected to give a dyeing of approximately equal intensity as Skein B. The bath was of the following formulation:

| Structure I red dye (M = Na) | .0012 parts |
|---|---|
| Structure II blue dye ($R_3$ = H, M = Na) | .0025 parts |
| Structure III yellow dye (M = Na) | .0026 parts |

Skein F, equal to skeins A, B, C, D and E was wet out in soft water then immersed in the dyebath at 195° F., at a pH of 4.0±.1 adjusted with acetic acid, for twenty minutes. Skein F was removed, rinsed in warm water, extracted and dried. The dyebath was completely exhausted.

Skein F represents the on tone dyeing. Skin B was compared to skein F by determining the respective color reflectance curves as measured on an ACS 500 color control system. The actual hue difference between the two skeins was quantified by calculating the value of $\sqrt{(Da^*)^2+(Db^*)^2}$. The smaller this number the more on tone is the cold strike of the trichromatic system. For the combination of Structure I red dye (M=Na), Structure II blue dye ($R_3$=H, M=Na) and Structure III yellow dye (M=Na), $\sqrt{(Da^*)^2+(Db^*)^2}$ was determined as 7.05.

For comparison purposes, a dyebath of total volume equal to 200 mls was prepared according to the following formulation:

| C. I. Acid Red 266 | .0078 parts |
|---|---|
| C. I. Acid Blue 324 | .0076 parts |
| Structure III yellow dye (M = Na) | .0085 parts |

The procedure described above was followed for this system. Skein F was dyed in a bath of the formulation:

| C. I. Acid Red 266 | .0023 parts |
|---|---|
| C. I. Acid Blue 324 | .0023 parts |
| Structure III yellow dye (M = Na) | .0026 parts |

Comparison of the color reflectance curves of skeins B and F as described gives a value of 10.29 for $\sqrt{(Da^*)^2+(Db^*)^2}$.

The smaller value of $\sqrt{(Da^*)^2+(Db^*)^2}$ for the trichromy consisting of Structure I red dye (M=Na), Structure II blue dye ($R_3$=H, M=Na) and Structure III yellow dye (M=Na) is indicative of a more on tone cold strike than displayed by the commercially utilized trichromy consisting of C. I. Acid Red 266, C. I. Acid Blue 324 and Structure III yellow dye (M=Na).

EXAMPLE 9

Cold Strike Dip Test

A dyebath of total volume equal to 200 mls. was prepared according to the following formulation:

| Structure I red dye (M = Na) | .0038 parts |
|---|---|
| Structure II blue dye ($R_3$ = H, M = Na) | .0081 parts |
| Structure V yellow dye (M = Na) | .0096 parts |

The procedure described in Example 8 was followed for this system. Skein F was dyed in a bath of the formulation:

| Structure I red dye (M = Na) | .0011 parts |
|---|---|
| Structure II blue dye ($R_3$ = H, M = Na) | .0024 parts |
| Structure V yellow dye (M = Na) | .0029 parts |

Comparison of the color reflective curves of the B and F skeins as described gives a value of 5.79 for $\sqrt{(Da^*)^2+(Db^*)^2}$.

Both the visual comparison of the skeins and the smaller value of $\sqrt{(Da^*)^2+(Db^*)^2}$ indicate a much greater degree of on tone cold strike for this trichromatic combination than displayed by the commercial trichromatic system consisting of C. I. Acid Red 266, C. I. Acid Blue 324 and Structure III yellow dye (M=Na).

EXAMPLE 10

CONTINUOUS DYEING OF NYLON CARPET

A dye solution was prepared containing the following:

| Structure I red dye (M = Na) | .0221 g/l |
|---|---|
| Structure II blue dye ($R_3$ = H, M = Na) | .0508 g/l |
| Structure III yellow dye (M = Na) | .0240 g/l |

In addition the following were added to the dyebath:

| Sodium Thiosulfate | .25 g/l |
|---|---|
| Diethylenetriamine pentacetic Acid | .25 g/l |

One roll of Monsanto Type 1878 Suessen set nylon carpet was dyed hot (150° F.) on a Fluidyer at 50 feet per minute and steamed in a vertical steamer to give a light grey shade.

Color differences between the sides and the middle of the carpet were measured in terms of Da* and Db* under both artificial and daylight. The total of the differences Da* and Db* was 0.3 or less, indicating excellent color matching from side to center to side.

EXAMPLE 11

Beck Dyeing of Nylon Carpet

In addition to the carpet (duPont Nylon Filament Superba Set), a carpet beck was charged with the following concentration of chemicals:

| | |
|---|---|
| Sodium Thiosulfate | 3.4 g/l |
| Diethylenetriaminepentaacetic acid | 3.4 g/l |
| Sulfonated alkyl diphenylether | 14.0 g/l |
| Nonsilicone oil-based defoamer | 2.5 g/l |
| Phosphate buffer (pH = 7.2) | 11.3 g/l |

The bath was heated to 85° F. and held twenty minutes. The dyes were then added at the following concentrations:

| | |
|---|---|
| Structure I red dye (M = Na) | .0221 g/l |
| Structure II blue dye ($R_3$ = H, M = Na) | .0508 g/l |
| Structure III yellow dye (M = Na) | .0240 g/l |

The beck was heated to 208° F. at a rate of 2.6° F. per minute. After 30 minutes at 208° F., the bath was allowed to cool to 180° F. The carpet was then rinsed and dried to yield a level dyed carpet of slate grey shade having excellent fastness to light and atmospheric gases.

I claim:

1. A process for dyeing natural and synthetic polyamide textile fibers by contacting said fibers with an aqueous solution containing a plurality of dyes, in which one of the dyes in said solution is a red acid dye having the structure:

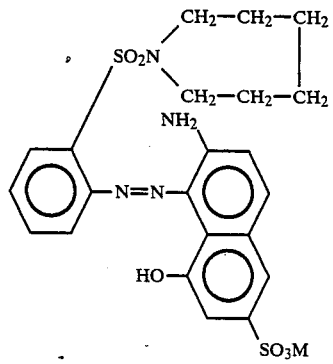

Wherein M is —Na, —K, —Li, or —N $(R_1)_4$, $R_1$ is —H or

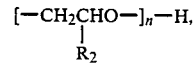

$R_2$ is —H, —CH$_3$ or —CH$_2$CH$_3$, and n is 1, 2, 3 or 4; and wherein the solution also contains at least one dye selected from a compatible acid blue dye, a compatible acid yellow dye or a mixture of said blue and yellow dyes; said blue dye having the structure:

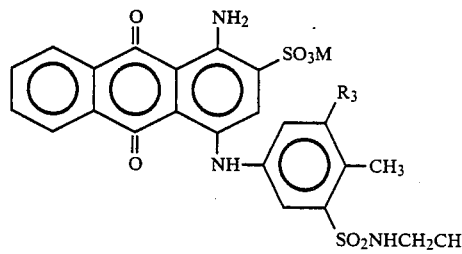

Wherein $R_3$ is —H or —CH$_3$ and M has the same meaning as above; and said yellow dye being at least one of the acid yellow dyes having the following structure:

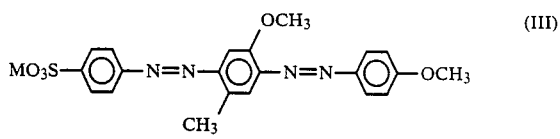

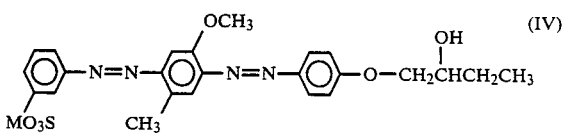

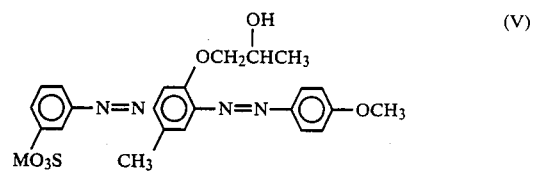

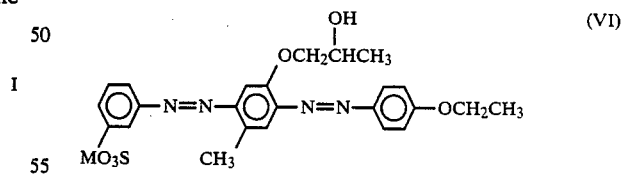

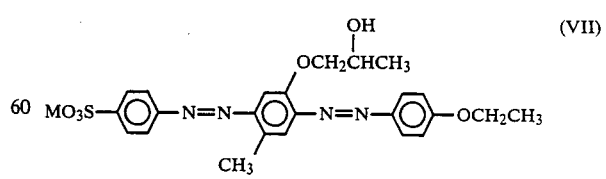

Wherein M in each of said yellow dye structures has the same meaning as above in Structure I.

2. The process according to claim 1 wherein the acid blue dye has the structure:

3. The process according to claim I wherein the acid blue dye has the structure:

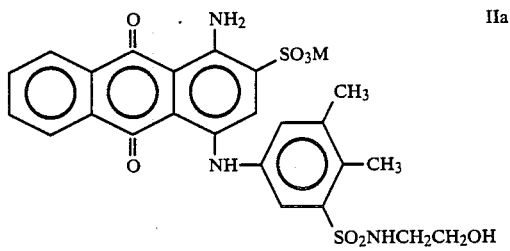
IIa

4. The process according to claim I wherein the acid yellow dye has the structure:

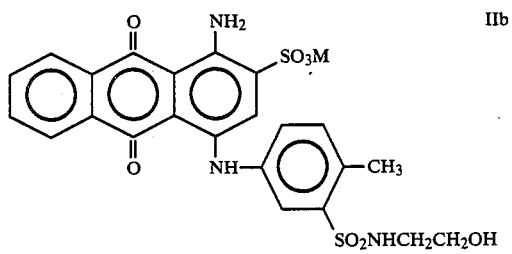
IIb

4. The process according to claim I wherein the acid yellow dye has the structure:

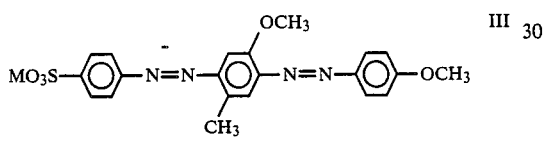
III

5. The process according to claim 1 wherein the acid yellow dye has the structure:

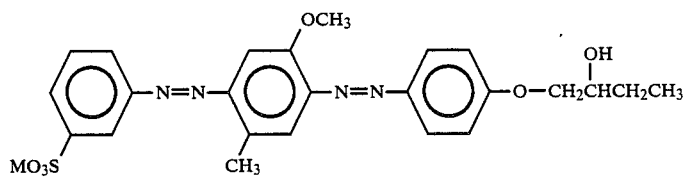
(IV)

6. The process according to claim 1 wherein the acid yellow dye has the structure:

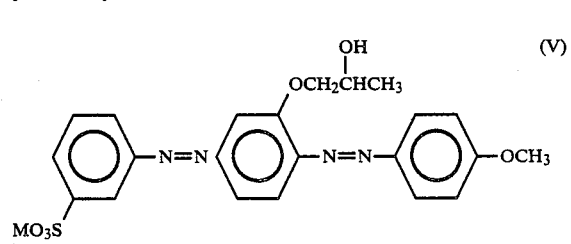
(V)

7. The process according to claim 1 wherein the acid yellow dye has the structure:

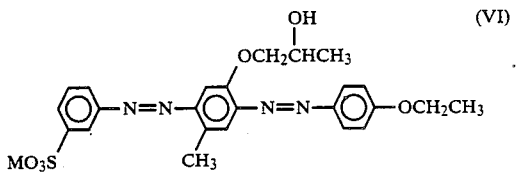
(VI)

8. The process according to claim 1 wherein the acid yellow dye has the structure:

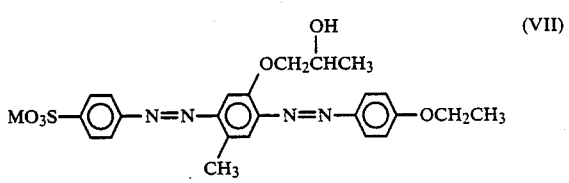
(VII)

9. The process according to any of the claims 1 through 8 wherein M is —Na.

10. An aqueous solution containing a plurality of dyes and wherein one of the dyes in the solution is an acid red dye having the structure:

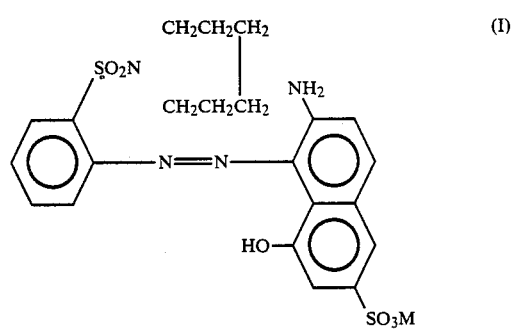
(I)

and wherein the solution also contains at least one dye selected from a compatible acid blue dye, a compatible acid yellow dye, or a mixture of said blue and yellow dyes, said blue dye having the structure:

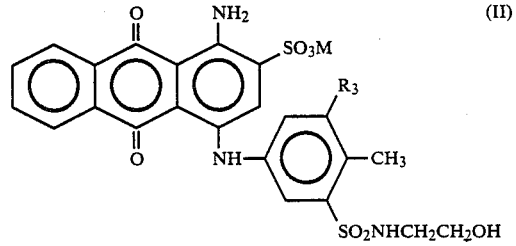
(II)

Where $R_3$ is —H or —CH$_3$ and said yellow dye having the structure:

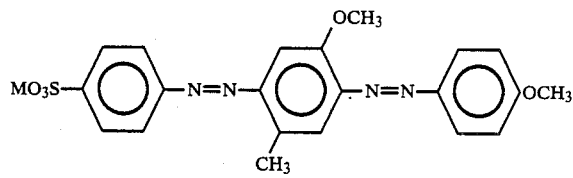      III

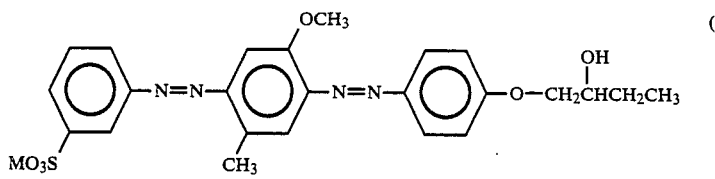      (IV)

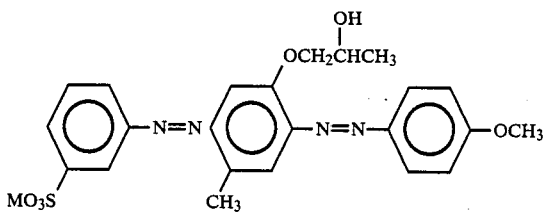      (V)

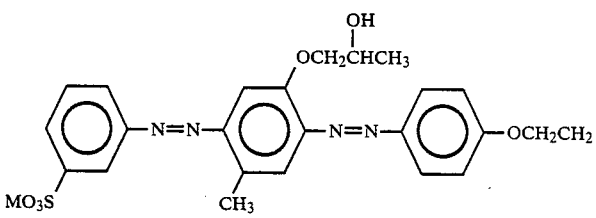      (VI)

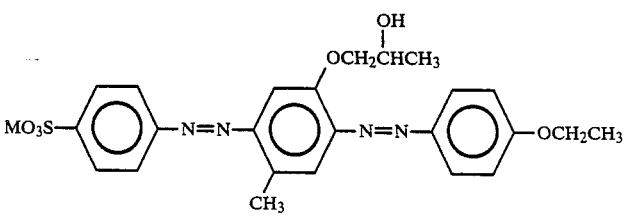      (VII)

Wherein M in each of the foregoing structures is —Na, —K, —Li or —N (R$_1$)$_4$; R$_1$ is —H or $[-CH_2CHO-]_nH;$
           $R_2$ R$_2$ is —H, —CH$_3$ or —CH$_2$CH$_3$; and n is 1, 2, 3 or 4.

11. An aqueous solution according to claim 10 wherein the blue dye is:

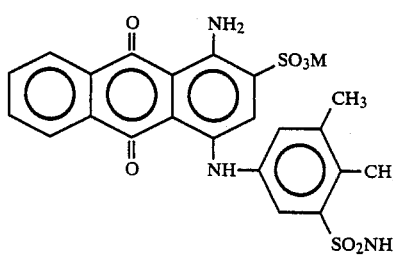   IIa

12. An aqueous solution according to claim 10 wherein the acid blue dye is:

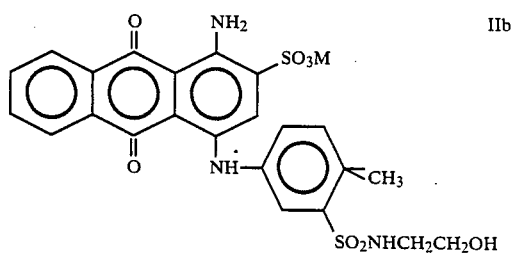   IIb

13. An aqueous solution according to claim 10 wherein the acid yellow dye is:

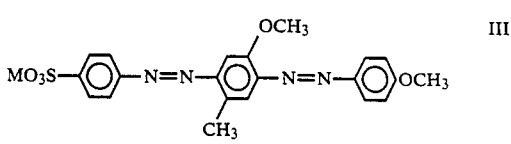   III

14. An aqueous solution according to claim 10 wherein the acid yellow dye is:

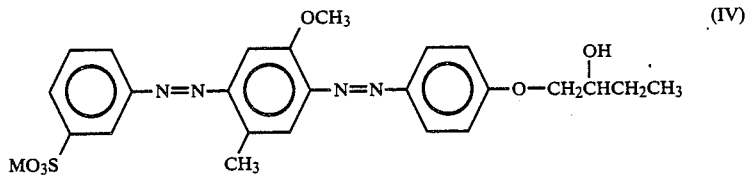
(IV)

15. An aqueous solution according to claim 10 wherein the acid yellow dye is:

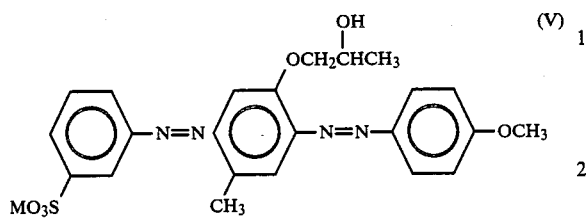
(V)

16. An aqueous solution according to claim 10 wherein the acid yellow dye is:

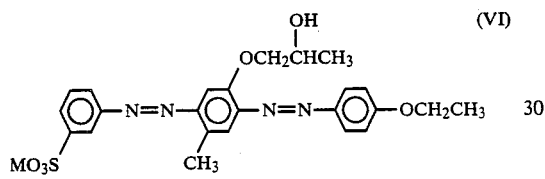
(VI)

17. An aqueous solution according to claim 10 wherein the acid yellow dye is

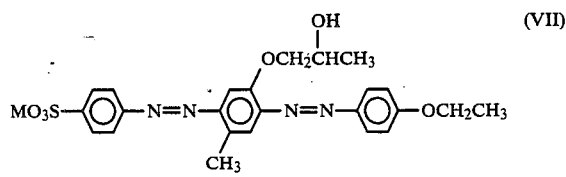
(VII)

18. An aqueous solution according to claim 10 wherein M is —Na.

19. An aqueous solution according to claim 10 wherein M is —N $(R_4)_4$; $R_4$ is H or

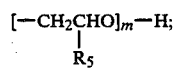

$R_5$ is —H or —$CH_3$; m is 1, 2 or 3.

20. Polyamide textile fibers dyed by the process of claim 1.

21. Polyamide carpet fibers dyed by the process of claim 1.

22. Polyamide textile fibers dyed with a plurality of dyes, and in which one of the dyes is a red acid dye having the structure:

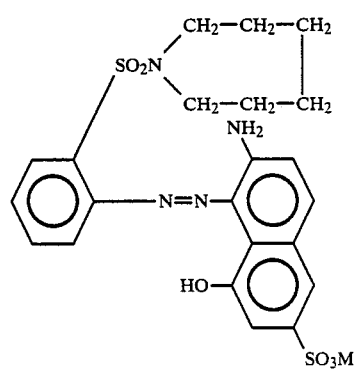
I

Wherein M is —Na, —K, —Li or —N $(R_1)_4$, $R_1$ is H or

$R_2$ is —H, —$CH_3$ or —$CH_2CH_3$, and n is 1, 2, 3 or 4; and wherein the solution also contains at least one dye selected from a compatible acid blue dye, a compatible acid yellow dye or a mixture of said blue and yellow dyes; said blue dye having the structure:

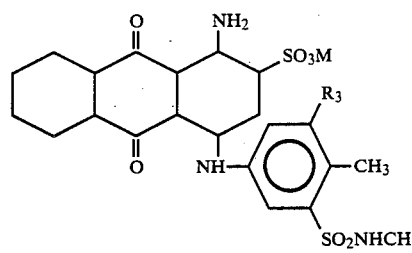

Wherein M and $R_3$ has the same meanings as above; and said yellow dye being at least one of the acid yellow dyes having the following structures:

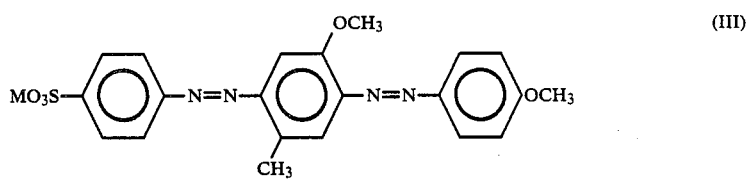
(III)

-continued
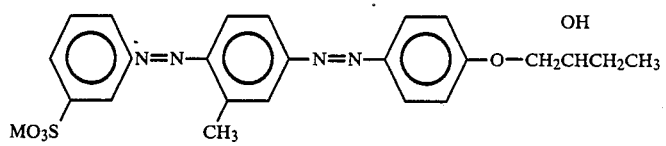
(IV)
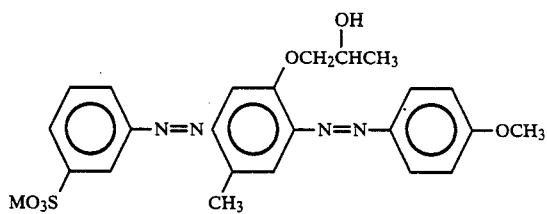
(V)
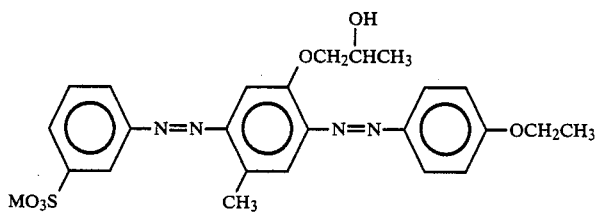
(VI)
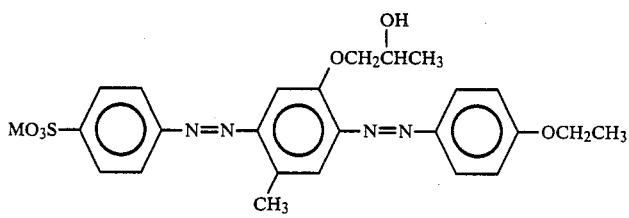
(VII)
Where M in each of said yellow dye structures has the same meaning as above.
23. A dyed fiber according to claim 22 wherein the fiber is a polyamide carpet fiber.
* * * * *